(12) United States Patent
Van Den Bossche

(10) Patent No.: US 7,280,226 B2
(45) Date of Patent: Oct. 9, 2007

(54) METHOD AND DEVICE FOR ENLARGING THE MEASUREMENT VOLUME OF AN OPTICAL MEASUREMENT SYSTEM

(75) Inventor: Alex Van Den Bossche, Walshoutem (BE)

(73) Assignee: Metris Engineering Services, Leuven (BE)

( * ) Notice: Subject to any disclaimer, the term of this patent is extended or adjusted under 35 U.S.C. 154(b) by 0 days.

(21) Appl. No.: 10/496,576

(22) PCT Filed: Nov. 22, 2002

(86) PCT No.: PCT/BE02/00177

§ 371 (c)(1),
(2), (4) Date: Nov. 8, 2004

(87) PCT Pub. No.: WO03/044457

PCT Pub. Date: May 30, 2003

(65) Prior Publication Data

US 2005/0062983 A1    Mar. 24, 2005

(30) Foreign Application Priority Data

Nov. 22, 2001   (BE) .................................. 2001/0756

(51) Int. Cl.
   *G01B 11/24*   (2006.01)
(52) U.S. Cl. .................................................. 356/601
(58) Field of Classification Search ................ 356/375, 356/426, 601
   See application file for complete search history.

(56) References Cited

U.S. PATENT DOCUMENTS 5,251,156 A * 10/1993 Heier et al. .................. 702/167
5,805,289 A *  9/1998 Corby et al. ................. 356/613
6,909,513 B1* 6/2005 Fujita et al. ................. 356/601

FOREIGN PATENT DOCUMENTS

DE      196 26 889 A1    1/1998
WO      WO98/48241      10/1998
WO      WO 01/07866 A1   2/2001

* cited by examiner

*Primary Examiner*—Gregory J. Toatley, Jr.
*Assistant Examiner*—Isiaka O Akanbi
(74) *Attorney, Agent, or Firm*—Browdy and Neimark, PLLC

(57) ABSTRACT

The invention concerns a method for enlarging the measuring volume of an optical measuring system and, on such a measuring system, at least one camera (2, 3, 4) to determine the position of at least one object (1) in relation to a base co-ordinate system, whereby, in order to measure the position of a point which is not situated within the field of vision of said camera (2, 3, 4), this camera (2, 3, 4) is moved in relation to a reference (7) having a fixed position in relation to said base co-ordinate system towards a measuring position, so that said point is situated within the field of vision of the camera (2, 3, 4), whereby the movement of the camera (2, 3, 4) in relation to said reference (7) is determined and the position of said point is perceived with said camera (2, 3, 4) in order to determine its position in relation to said base co-ordinate system, taking into account the movement of the camera (2, 3, 4).

7 Claims, 1 Drawing Sheet

METHOD AND DEVICE FOR ENLARGING THE MEASUREMENT VOLUME OF AN OPTICAL MEASUREMENT SYSTEM

The invention concerns a method and a device for enlarging the measuring volume of an optical measuring system with at least one camera to determine the position of at least one point of an object in relation to a base co-ordinate system.

According to the present methods and with the existing optical measuring systems it is not possible to measure the position of points situated outside the field of vision of the cameras of the optical measuring system. Thus, it is not possible, for example, to measure the position of points situated on the backside of an object to be measured, since in this case the object itself is situated between the camera and the point to be measured. Nor is it possible to measure the position of points situated on the backside of the camera in a precise manner.

The invention aims to remedy these disadvantages by providing a simple and precise method and an optical measuring system which make it possible to measure the position of points which are not situated within the field of vision of the camera.

To this aim, the camera of the optical measuring system is moved in relation to a reference having a fixed position in relation to said base co-ordinate system, towards a measuring position, so that said point is situated within the field of vision of the camera, whereby the movement of the camera in relation to said reference is determined and the position of said point is perceived with said camera in order to calculate its position in relation to said base co-ordinate system, taking into account the movement of the camera.

Practically, use is made of a holder with a measuring point and at least three reference points which are not situated on a straight line, whereby said measuring point is placed against the above-mentioned point whose position needs to be determined. Next, the position of said reference points is measured by means of said camera and, on the basis of the position of these reference points, the position of said point is calculated, whereby the reference points are perceived with said camera and the camera is automatically moved when the position of said holder is changed in order to keep the latter within the field of vision of the camera.

In an advantageous manner, said camera is rotated, so that the above-mentioned point to be measured is situated within its field of vision.

According to a preferred embodiment of the method according to the invention, said reference is formed of at least three reference organs which are not situated on a straight line, provided in said measuring volume in a fixed position in relation to the base co-ordinate system.

According to an interesting embodiment of the method according to the invention, each of the reference organs has at least three reference points with a fixed position in relation to one another, whereby the position of these reference points is measured in order to calculate the corresponding position of said reference organs on the basis thereof.

Said reference organs may possibly be rotated in relation to said fixed position, as a result of which its reference points can be perceived by said camera.

The invention also concerns an optical measuring system with at least one camera for measuring the position of a point of an object, in particular an optical measuring system for applying the above-mentioned method, characterised in that it has at least one reference organ which is to be placed in a fixed position in the measuring volume of the optical measuring system, whereby this reference organ has at least three reference points which make it possible to determine the position of the reference organ by means of said camera, whereby means are further provided which allow to move the camera in relation to said reference organ and to measure this movement.

Further, the invention concerns an optical measuring system with at least one camera for measuring the position of the point of an object, in particular an optical measuring system whereby said camera is mounted such that it can rotate in relation to the environment, and whereby means are provided to determine its rotational movement.

Other particularities and advantages of the invention will become clear from the following description of some specific embodiments of the method and the optical measuring system according to the invention; this description is given as an example only and does not restrict the scope of the claimed protection in any way; the figures of reference used hereafter refer to the accompanying drawings.

In the different drawings, the same reference figures refer to identical or analogous elements.

The invention in general concerns an optical measuring system whereby use is made of at least one camera to measure the position of a point. Preferably, the measuring system has two or three cameras which perceive the point to be measured from different positions. These cameras can for example be linear cameras or matrix cameras.

The points whose position can be measured with the optical measuring system are situated in the measuring volume thereof. This measuring volume is formed of the space which can be perceived by the cameras of the measuring system in which the position of a point can be measured with sufficient accuracy.

When the position of a point needs to be measured, this point is marked by means of for example a point of light such as for example an LED, so that it can be clearly perceived by the cameras of the measuring system.

According to another, frequently used method, the point to be measured is touched by the measuring point of a holder provided to this end. Such a holder has, apart from said measuring point, at least three reference points which are not situated on a straight line, whose position is measured by means of said cameras when the measuring point is placed against said point to be measured. On the basis of the position of these reference points, the position of the measuring point and consequently of the point to be measured is then calculated. These reference points consist for example of a point of light or an element emitting an optical signal, such as for example a light-emitting diode (LED).

The use of such a holder in optical measuring systems is already sufficiently known as such and is described for example in patent application WO 98/48241.

Figure 1:
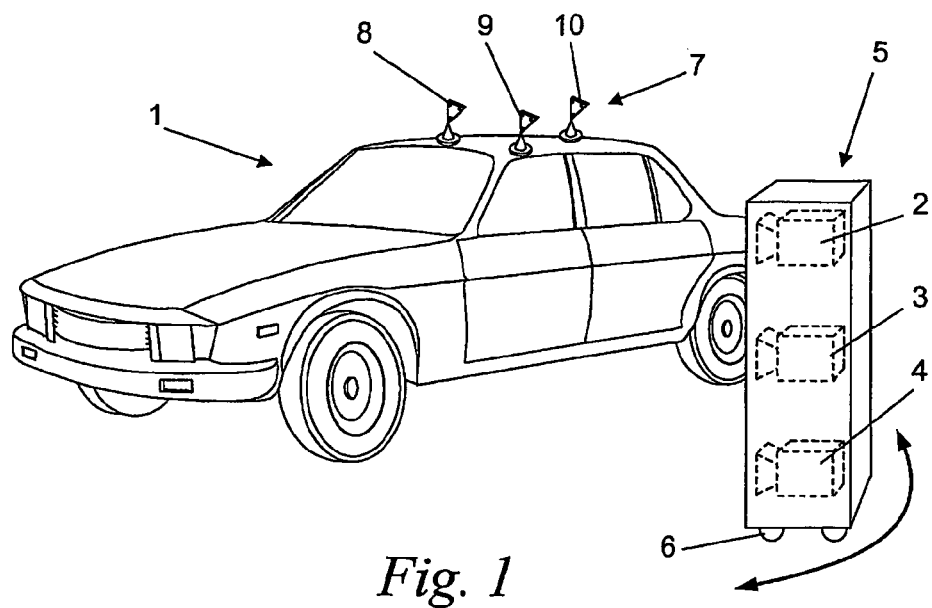
FIG. 1 is a schematic view in perspective of an object and the cameras of an optical measuring system according to a first embodiment of the invention.

FIG. 1 represents an object 1 in the shape of a passenger car, perceived by three cameras 2, 3 and 4 of an optical measuring system. These cameras have been mounted in a common housing 5. The housing 5 is provided with means which make it possible to move it in a simple manner. In particular, the housing 5 is provided with small wheels 6 on the bottom side.

Thus, the position of the points of the object 1, situated within the field of vision of the cameras 2, 3 and 4, can be determined in relation to a base co-ordinate system having a fixed position in relation to the cameras 2, 3 and 4 by means of said housing 5. However, it is not possible to determine the position of points situated on the backside of the object 1 in relation to the cameras 2, 3 and 4, and thus outside the field of vision of these cameras, as of the position in which the housing 5 is situated.

In order to determine the position of such points which are not situated within the field of vision of the cameras 2, 3 and 4 in their initial position, a reference 7 is provided in said measuring volume. The position of this reference 7 in relation to the base co-ordinate system is measured. This is preferably done by means of the optical measuring system.

In order to measure the position of points situated on said backside of the object 1, the housing 5 with the cameras 2, 3 and 4 is moved into what is called a measuring position, whereby said points are provided on the backside of the object within the field of vision of the cameras and thus can be perceived by the latter. After the cameras have thus been moved, the position of said reference 7 is measured again with the optical measuring system, such that the movement of the housing 5 and of the cameras 2, 3 and 4 is univocally determined. In this way, the movement of the cameras in relation to the base co-ordinate system is known.

Next, the position of the points to be measured of this backside of the object 1 are measured by means of said cameras 2, 3 and 4. In order to calculate the position of these points in relation to said base co-ordinate system, the movement of the cameras from their initial position to said measuring position will be taken into account.

In the embodiment of the optical measuring system according to the invention, represented in FIG. 1, said reference 7 consists of three reference organs 8, 9 and 10, fastened in a fixed position in the measuring volume of the measuring system. In particular, these reference organs 8, 9 and 10 are fixed on the object 1, in particular on its top side.

Figure 2:
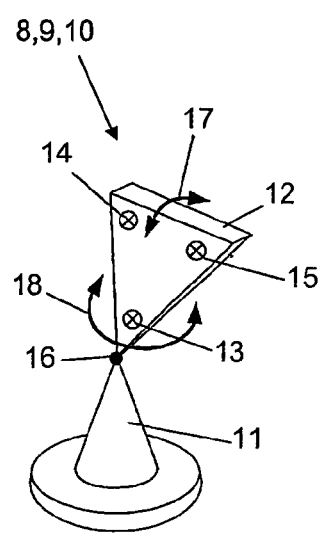
FIG. 2 is a schematic view in perspective of a reference organ according to the invention.

FIG. 2 represents a specific embodiment of such a reference organ having a fastening part 11 and a reference part 12 with three reference points 13, 14 and 15 which are not situated on a straight line. These reference points preferably each consist of a light point or an element emitting an optical signal, such as for example a light-emitting diode (LED). The reference part 12 is mounted to the fastening part 11 via a ball hinge 16, such that the reference part 12 can rotate freely around a ball joint point, determined by said ball hinge 16, in relation to the fastening part 11, as is represented by the arrows 17 and 18.

The fastening part 11 is preferably provided with fastening means, such as for example a suction cup, in order to fasten the corresponding reference organ in said measuring volume in a fixed position.

Further, the mutual position of the reference points 13, 14 and 15 and the position of these reference points in relation to said ball hinge 16 and in relation to the corresponding ball hinge point is determined. Thus, the position of this ball hinge point can be derived from the position of the reference points 13, 14 and 15.

According to a variant of this embodiment, it is not required that the mutual position of the reference points 13, 14 and 15 and their position in relation to the ball hinge point is known. In order to determine the position of the ball hinge point, the reference organ 12 is rotated in at least two different positions around the ball hinge point, whereby the position of the reference points 13, 14 and 15 is measured by means of the above-mentioned cameras. Each of the reference points 13, 14 and 15 is hereby moved according to the surface of a sphere. By means of the thus measured positions of the reference points 13, 14 and 15, the optical measuring system will calculate the position of the middle point of the spheres, which describe the reference points 13, 14 and 15 of the reference part 12. The position of this middle point will then coincide with the position of the ball hinge point.

In FIG. 1, three reference organs 8, 9 and 10 were fixed with said fastening part 11 to the top side of the object 1.

When the position of said reference 7 is measured, the position of the ball hinge points 16 of each of the reference organs 8, 9 and 10 will consequently be calculated on the basis of the measured positions of each of the corresponding reference points 13, 14 and 15 thereof.

As this reference part 12 can be rotated in relation to the fastening part 11 of each reference organ 8, 9 and 10, it is possible to rotate the reference part 12 such that its reference points 13, 14 and 15 can be perceived by the cameras 2, 3 and 4.

In an advantageous manner, each of the reference organs 8, 9 and 10 will be driven by, for example, an electric motor. In particular, the reference part 12 is driven in such a manner in relation to the fastening part 11 that the reference points 13, 14 and 15, as the cameras 2, 3 and 4 are moved, will always be directed towards the latter and consequently can be perceived by them. The reference organs 8, 9 and 10 are hereby controlled by means of a following algorithm known as such. According to a variant of this embodiment, the reference points 13, 14 and 15, which consist for example of light-emitting diodes, are driven themselves in order to follow the movement of the cameras.

Figure 3:
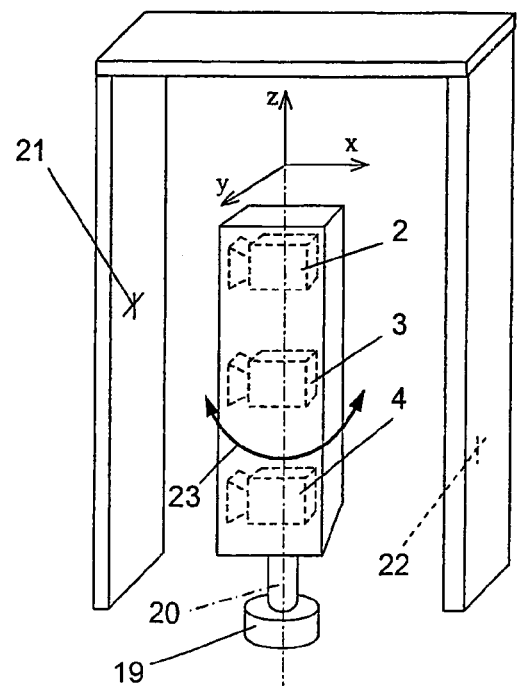
FIG. 3 is a schematic view in perspective of the cameras of an optical measuring system according to a second embodiment of the invention.

FIG. 3 represents a housing 5 with three cameras 2, 3 and 4 of an optical measuring system according to a second embodiment of the invention. The housing 5 is fixed on a foot 19 in such a manner that it can undergo a movement, together with the cameras 2, 3 and 4, in relation to the foot 19. In particular, the housing 5 is mounted such that it can rotate in relation to the foot 19 around a vertical axis of rotation 20.

In order to thus measure the positions of certain points in relation to a fixed base co-ordinate system of an object 1 situated outside the measuring volume, and thus outside the field of vision of the cameras, the housing 5 can be rotated as represented by the arrow 23.

The object 1 which is represented in FIG. 3 consists of a U-shaped frame with two parallel standing beams connected to one another at the top by means of a horizontal beam. When the position of several points of the object 1 has to be measured, whereby a number of these points are situated within the field of vision of the camera and the other points are situated on the backside of the cameras, and thus outside their fields of vision, the housing 5 with the cameras will be rotated as of the initial position, as represented in FIG. 3, in relation to said axis of rotation 20 until the other points to be measured come into the field of vision of the cameras.

The cameras are hereby placed between said vertical beams of the object 1 in such a way that it becomes possible, at a first stage, in an initial position of the cameras, to measure the position of a point 21 of the first one of these beams in relation to said base co-ordinate system.

In order to subsequently measure the position of the point 22 situated on the opposite vertical beam, the housing 5 with the cameras is rotated, at a second stage, around the axis of rotation 20 in relation to a fixed reference, formed of the foot 19, into what is called a measuring position whereby the point 22 comes within the field of vision of the cameras. During this movement of the cameras 2, 3 and 4, the angle and the sense of rotation of the housing 5 with the cameras between said initial position and the measuring position is determined. The latter can be done by making use of what is called an angle encoder, provided for example at the foot 19.

Finally, the point 22 is perceived by means of the cameras 2, 3 and 4, and its position is calculated in relation to the above-mentioned base co-ordinate system, taking into account the determined movement of the housing 5 and the cameras 2, 3 and 4.

When the above-mentioned holder, provided with at least three reference points, is used to measure the positions of certain points of an object 1, said foot 19 upon which the housing 5 with the cameras rests, according to a specific embodiment of the invention, is equipped with for example an electric motor. The reference points of this holder are perceived by means of said cameras, whereby a signal is given to said motor by the measuring system when the holder is moved in order to drive the housing 5 and to rotate it around said axis of rotation, and thus keep the holder within the field of vision of the cameras. In this way is made sure that the cameras are automatically moved when said holder changes its position without any need for the housing 5 to be manually moved.

Although the housing 5 with the cameras 2, 3 and 4, represented in FIG. 3, has only one axis of rotation, it is possible to provide several axes of rotation according to a variant of this embodiment of the measuring system. Thus, it is for example possible to provide a horizontal axis of rotation, apart from said vertical axis of rotation, with an accompanying angle encoder, so that the positions of points situated above the cameras can also be measured in relation to the same base co-ordinate system.

Further, it is also possible that said foot 19 upon which the housing is mounted in a rotating manner also has means to undergo a translation, for example in a horizontal plane. Thus, the foot 19 can for example be moved in a guiding rail towards a measuring position whereby the distance over which the foot moves is measured.

As a result, the above-mentioned optical measuring system and the corresponding method make it possible to determine the position of all the points of an object in relation to one and the same fixed base co-ordinate system.

Of course, the method and the optical measuring system according to the invention are not restricted to the above-described embodiments represented in the accompanying figures.

Although the reference organ, as represented in FIG. 2, has a reference part 12 which can be rotated in relation to a ball hinge point, it is also possible for this reference part 12 to only undergo a rotation around a hinge pin in relation to the fastening part 11, or even for the reference part 12 to be fixed to the latter.

The invention claimed is:

1. Method for enlarging the measuring volume of an optical measuring system with at least one camera (2, 3, 4) to determine the position of at least one point of an object (1) in relation to a base co-ordinate system, characterised in that, in order to determine the position of a point which is not situated within the field of vision of said camera (2, 3, 4), this camera (2, 3, 4) is moved in relation to a reference (7), having a fixed position in relation to said base co-ordinate system, towards a measuring position, so that said point comes within the field of vision of the camera (2, 3, 4), whereby the movement of the camera (2, 3, 4) in relation to said reference (7) is determined and the position of said point is perceived with said camera (2, 3, 4) in order to calculate its position in relation to said base co-ordinate system, taking into account the movement of the camera (2, 3, 4), and at least one part (12) of each of said reference organs (8, 9, 10) is rotated in relation to said fixed position, so that the reference points (13, 14, 15) thereof can be perceived by said camera (2, 3, 4).

2. Method according to claim 1, characterised in that said part (12) of each of the above-mentioned reference organs (8, 9, 10) is driven so as to move it as a function of the movement of said camera (2, 3, 4), whereby the whole is oriented such that the reference points (13, 14, 15) will at all times remain within the field of vision of the camera (2, 3, 4).

3. Optical measuring system with at least one camera (2, 3, 4) for measuring the position of a point of an object (1), in particular an optical measuring system for applying a method for enlarging the measuring volume of the optical measuring system to determine the position of at least one point of an object (1) in relation to a base co-ordinate system, wherein to determine the position of a point which is not situated within the field of vision of said camera (2, 3, 4), the camera (2, 3, 4) is moved in relation to a reference (7), having a fixed position in relation to said base co-ordinate system, towards a measuring position, so that said point comes within the field of vision of the camera (2, 3, 4), and whereby the movement of the camera (2, 3, 4) in relation to said reference (7) is determined and the position of said point is perceived with said camera (2, 3, 4) in order to calculate its position in relation to said base co-ordinate system, taking into account the movement of the camera (2, 3, 4), the optical measuring system comprising at least one reference organ (8, 9, 10) which must be placed in a fixed position in the measuring volume of the optical measuring system, whereby this reference organ (8, 9, 10) has at least three reference points (13, 14, 15) which make it possible to determine the position of the reference organ (8, 9, 10) by means of said camera (2, 3, 4), whereby means are further provided which make it possible to move the camera (2, 3, 4) in relation to said reference organ (8, 9, 10) and to measure this movement, whereby said reference organ (8, 9, 10) has a fastening part (11) and a reference part (12), whereby the latter comprises the reference points (13, 14, 15) of the reference organ, and whereby the reference part (12) can be rotated in relation to the fastening part (11).

4. Optical measuring system according to claim 3, characterised in that said camera (2, 3, 4) is mounted such that it can be rotated in relation to the environment, whereby means are provided to determine its rotational movement.

5. Optical measuring system according to claim 4, characterised in that said camera (2, 3, 4) is mounted such that it can be rotated in relation to a foot (19).

6. Optical measuring system according to claim 4, characterised in that said camera (2, 3, 4) is driven by an electric motor in order to undergo said rotational movement.

7. Optical measuring system according to claim 4, characterised in that an angle encoder is provided in order to measure the rotational movement of said camera (2, 3, 4).

* * * * *

UNITED STATES PATENT AND TRADEMARK OFFICE
CERTIFICATE OF CORRECTION

| | | |
|---|---|---|
| PATENT NO. | : 7,280,226 B2 | Page 1 of 1 |
| APPLICATION NO. | : 10/496576 | |
| DATED | : October 9, 2007 | |
| INVENTOR(S) | : Alex Van Den Bossche | |

It is certified that error appears in the above-identified patent and that said Letters Patent is hereby corrected as shown below:

In Col. 6, line 6, after "and" insert the following:

--said reference (7) is formed of at least three reference organs (8,9,10) which are not situated on a straight line, provided in a fixed position in relation to the base co-ordinate system in said measuring volume, and--

Signed and Sealed this

Third Day of June, 2008

JON W. DUDAS
*Director of the United States Patent and Trademark Office*